US012600343B2

(12) United States Patent
Takayama et al.

(10) Patent No.: US 12,600,343 B2
(45) Date of Patent: Apr. 14, 2026

(54) VEHICLE DRIVING FORCE CONTROL DEVICE

(71) Applicant: Mazda Motor Corporation, Hiroshima (JP)

(72) Inventors: Shinji Takayama, Aki-gun (JP); Takefumi Takada, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 267 days.

(21) Appl. No.: 18/190,017

(22) Filed: Mar. 24, 2023

(65) Prior Publication Data

US 2023/0365119 A1 Nov. 16, 2023

(30) Foreign Application Priority Data

May 13, 2022 (JP) ................................ 2022-079611

(51) Int. Cl.
B60W 20/15 (2016.01)
B60W 10/06 (2006.01)
(Continued)

(52) U.S. Cl.
CPC ............ B60W 20/15 (2016.01); B60W 10/06 (2013.01); B60W 10/08 (2013.01); F02P 5/1504 (2013.01);
(Continued)

(58) Field of Classification Search
CPC ...... B60W 20/15; B60W 10/06; B60W 10/08; B60W 2510/0604; B60W 2510/0657;
(Continued)

(56) References Cited

U.S. PATENT DOCUMENTS

| | | | | |
|---|---|---|---|---|
| 11,420,612 B2* | 8/2022 | Ruybal | ................. | B60W 10/08 |
| 11,448,150 B2* | 9/2022 | Ishikawa | ............. | F02D 41/0007 |
| 11,654,887 B2* | 5/2023 | Akiyama | .............. | B60W 10/08 |
| | | | | 701/22 |

(Continued)

FOREIGN PATENT DOCUMENTS

| | | |
|---|---|---|
| JP | 2005287234 A | 10/2005 |
| JP | 2006067737 A | 3/2006 |

(Continued)

OTHER PUBLICATIONS

European Patent Office, Extended European Search Report Issued in EP Application No. 23161723.4, Oct. 20, 2023, Munich, 7 pages.

*Primary Examiner* — Christopher George Fees
(74) *Attorney, Agent, or Firm* — Alleman Hall & Tuttle LLP

(57) ABSTRACT

A driving force control device for a vehicle is provided, which includes a motor, an engine, and a controller. The controller sets a target torque of the vehicle corresponding to accelerator operation, distributes a target engine torque, based on the target torque, and outputs a control signal corresponding to the target engine torque. The controller estimates a future amount of intake air to a cylinder based on the target engine torque, and estimates an engine torque after a setup time from the present time based on the estimated future amount of intake air. The controller sets a target motor torque after the setup time based on the estimated engine torque after the setup time so that the target torque is achieved, and outputs a control signal corresponding to the target motor torque to synchronize a torque response of the engine with a torque response of the motor.

6 Claims, 10 Drawing Sheets

FRONT ◄————————► REAR

(51) Int. Cl.
B60W 10/08 (2006.01)
F02P 5/15 (2006.01)

(52) U.S. Cl.
CPC ............... *B60W 2510/0604* (2013.01); *B60W 2510/0657* (2013.01); *B60W 2510/083* (2013.01); *B60W 2540/10* (2013.01); *B60W 2710/0666* (2013.01); *B60W 2710/083* (2013.01)

(58) Field of Classification Search
CPC ....... B60W 2510/083; B60W 2540/10; B60W 2710/0666; B60W 2710/083; B60W 2510/0609; B60W 2510/0619; B60W 2510/0628; B60W 2510/0671; B60W 2510/0676; B60W 2510/087; B60W 2510/244; B60W 2540/103; B60W 2540/106; B60W 2710/0605; B60W 2710/0611; B60W 2710/0616; B60W 2710/0622; B60W 2710/0633; B60W 2710/0672; B60W 2710/085; B60W 20/11; B60W 20/19; B60W 20/40; B60W 30/1882; B60W 30/192; B60W 50/0097; B60W 40/00; B60W 2510/06; B60W 2510/0638; B60W 2510/081; B60W 2520/10; F02P 5/1504; B60K 6/48; B60K 2006/4825; B60K 6/387; Y02T 10/62
See application file for complete search history.

(56) References Cited

U.S. PATENT DOCUMENTS

| | | | | |
|---|---|---|---|---|
| 11,845,420 | B2 * | 12/2023 | Ravichandran | ....... B60W 10/08 |
| 2008/0257323 | A1 * | 10/2008 | Sugimoto | ............ F02P 5/1504 |
| | | | | 123/625 |
| 2010/0038158 | A1 * | 2/2010 | Whitney | ................ B60K 6/485 |
| | | | | 180/65.265 |
| 2011/0137504 | A1 * | 6/2011 | Nakamura | ............ F01L 1/3442 |
| | | | | 180/65.265 |
| 2016/0090929 | A1 * | 3/2016 | Tanaka | .................... F02D 21/08 |
| | | | | 123/406.12 |
| 2016/0123249 | A1 * | 5/2016 | Sakayanagi | ............. G01L 23/22 |
| | | | | 701/111 |
| 2020/0032728 | A1 * | 1/2020 | Matsushima | ....... F02D 41/0002 |
| 2020/0231139 | A1 * | 7/2020 | Yamamoto | ............ B60W 30/20 |

FOREIGN PATENT DOCUMENTS

| | | | |
|---|---|---|---|
| JP | 2014047760 | A | 3/2014 |
| JP | 2018135047 | A | 8/2018 |
| WO | 2010134183 | A1 | 11/2010 |

* cited by examiner

VEHICLE DRIVING FORCE CONTROL DEVICE

TECHNICAL FIELD

The technology disclosed herein relates to a driving force control device for a vehicle.

BACKGROUND OF THE DISCLOSURE

JP2006-067737A discloses a hybrid vehicle in which an engine and a motor are mounted. The engine and the motor share the output of a demanded torque according to an accelerator operation by a driver. When requesting a torque increase both to the engine and the motor, a controller of the hybrid vehicle delays a torque demand to the motor by a given period of time which imitates a response delay of the engine.

The hybrid vehicle in which the engine and the motor are mounted distributes a target torque of the vehicle to the engine and the motor so that the energy efficiency becomes the optimal. The torque distribution to the engine and the motor changes in turn, for example, according to an SOC (State of Charge), a battery state such as a temperature, and/or an engine state including an engine water temperature.

Generally, the torque response of the engine is slower than the torque response of the motor. Therefore, during a transition in which the target torque changes, a torque change of the engine may be delayed from a torque change of the motor. The delay of the torque change of the engine causes a torque change of the vehicle. Further, the delay of the torque change of the engine may cause a deviation of the sum total torque which is actually generated by the engine and the motor from the target torque.

Conventional hybrid vehicles delay a timing of the torque increase of the motor so that it coincides with a timing of the torque increase of the engine. In the conventional hybrid vehicles, since the engine torque increase synchronizes with the motor torque increase, the torque change does not easily occur.

However, in the conventional hybrid vehicles, in order to delay the timing of the motor torque increase, the torque increase of the automobile is delayed from the driver's accelerator operation. The conventional hybrid vehicles are not good in terms of drivability. Further, unfortunately, since the conventional hybrid vehicles only synchronize the engine torque increase with the motor torque increase, the deviation of the actual torque from the target torque cannot be improved.

SUMMARY OF THE DISCLOSURE

The technology disclosed herein improves a deviation of an actual torque from a target torque, while suppressing a response delay of a torque change from a driver's accelerator operation.

In a hybrid vehicle in which an engine and a motor are mounted, it is possible to achieve both suppression of a response delay and improvement in a deviation of a torque by making the motor supplement the response delay of the engine. That is, when changing a target engine torque according to a driver's accelerator operation, it is possible that a controller calculates a difference between an actual engine torque and the target engine torque, and corrects a target motor torque so that the difference in the engine torque is supplemented by the motor torque. A high-response motor can supplement the difference in the engine torque caused by the response delay of the engine. The supplement by the motor can suppress the response delay of the torque with respect to the accelerator operation, and can also improve the deviation of the actual torque from the target torque.

However, it takes time for detecting the engine torque, calculating the torque difference, and/or setting an amount of correction of the motor torque. In the above-described control process, the actual engine torque changes every moment even during the setting of the amount of correction of the motor after detecting the engine torque. The correction of the motor torque follows after the change in the actual engine torque. The deviation of the actual torque from the target torque is not eliminated.

The present inventors conceived a technical idea of predicting the change in the engine torque to estimate the engine torque in the future from the present time and setting a target motor torque after a setup time from the present time based on the estimated engine torque. The present inventors proceeded with establishment of a control for realizing the technical idea, and completed the technology disclosed herein.

In detail, the technology disclosed herein relates to a driving force control device for a vehicle. The driving force control device for a vehicle includes a motor which generates torque for the vehicle to travel by being supplied with electric power, an engine which combusts fuel inside a cylinder to generate torque for the vehicle to travel, and a controller which receives an accelerator operation signal and outputs a control signal corresponding to the accelerator operation to the motor and the engine. The controller sets a target torque of the vehicle corresponding to the accelerator operation, and distributes a target engine torque according to a predefined distribution rule, based on the target torque of the vehicle, and outputs a control signal corresponding to the target engine torque to the engine. The controller estimates a future amount of intake air to the cylinder from the present time based on the target engine torque, and estimates a torque of the engine after a setup time from the present time based on the estimated future amount of intake air. The controller sets a target motor torque after the setup time based on the estimated torque of the engine after the setup time so that the target torque of the vehicle is achieved, and outputs a control signal corresponding to the target motor torque to the motor to synchronize a torque response of the engine with a torque response of the motor.

In this configuration, the vehicle is provided with the motor and the engine, and is a so-called hybrid vehicle. The controller distributes the target torque of the vehicle to the target engine torque and the target motor torque so that the target torque of the vehicle corresponding to the accelerator operation is achieved. The engine outputs the target engine torque, and the motor outputs the target motor torque. The engine and the motor realize the target torque of the vehicle.

The controller distributes the target engine torque according to the distribution rule defined beforehand. The distribution rule is, for example, based on an SOC (State of Charge) of a battery. The battery is mounted on the vehicle for supplying electric power to the motor. When the SOC is high, the controller may decrease the target engine torque and increase the target motor torque increases to give priority to electric discharge of the battery. When the SOC is low, the controller may increase the target engine torque and decrease the target motor torque to give priority to the charging of the battery. The controller outputs a control signal corresponding to the target engine torque to the engine. The engine operates to output the target engine torque.

When the driver operates the accelerator, the controller changes the target torque of the vehicle according to the change in the accelerator operation. In response to the change in the target torque of the vehicle, the controller changes the target engine torque. When the target engine torque changes, the engine changes, for example, the throttle valve opening, resulting in a change in the amount of intake air to the cylinder. The change in the amount of intake air to the cylinder changes the engine torque. A time lag arises between the time the target torque is changed and the time the engine torque is actually changed through the change in the throttle valve opening and the change in the amount of intake air.

The change in the throttle valve opening according to the change in the target engine torque can be estimated by identifying beforehand, for example, characteristics of the throttle valve (including, for example, mechanical characteristics). When the change in the throttle valve opening in the future from the present time can be estimated, the amount of intake air in the future can be estimated. When the amount of intake air can be estimated, the engine torque in the future can be estimated. The controller estimates the engine torque in the future based on the target engine torque. In more detail, the controller estimates the torque of the engine after the setup time from the present time.

Further, when the engine torque after the setup time from the present time is estimated, the controller sets the target motor torque after the setup time so that the target torque of the vehicle is achieved. If the estimated engine torque is lower than the target engine torque, the target motor torque is set to large to supplement the insufficient engine torque. If the estimated engine torque is higher than the target engine torque, the target motor torque is set to small, in consideration of the excess of the engine torque. The set target motor torque supplements the delay of the torque response of the engine.

The controller outputs the control signal corresponding to the target motor torque to the motor. Since the torque response of the motor is generally high, the motor can output the torque corresponding to the target motor torque after the setup time. The torque response of the engine synchronizes with the torque response of the motor. As a result, the torque variation of the vehicle is suppressed, and further, the target torque of the vehicle is achieved.

Since the high-response motor supplements the response delay of the engine, the response delay of the torque change with respect to the accelerator operation is suppressed in the above-described driving force control device.

Further, the engine torque in the future is estimated and the target motor torque is set based on the estimated engine torque in the future, instead of the actual engine torque. The set target motor torque does not follow after the change in the actual engine torque. In the above-described driving force control device, the deviation of the actual torque from the target torque can be eliminated or substantially eliminated by synchronizing the torque response of the engine with the torque response of the motor.

As a result, the above-described driving force control device improves the drivability of the driver.

When estimating the torque of the engine, the controller may delay a torque change of the engine with respect to a change in the estimated future amount of intake air as an engine speed of the engine increases.

When the engine speed is high, a combustion interval (i.e., a time interval) of the plurality of cylinders of the engine is short. When the engine speed is low, the combustion interval (i.e., the time interval) of the plurality of cylinders is long. A time after the amount of intake air to the cylinder changes until the torque of the engine actually changes varies according to the engine speed. When the engine speed is high, the time after the amount of intake air to the cylinder changes until the torque of the engine changes is short. When the engine speed is low, the time after the amount of intake air to the cylinder changes until the torque of the engine changes is long.

When the engine speed is low, the controller delays the torque change of the engine with respect to the change in the estimated future amount of intake air as the engine speed decreases. The controller can estimate the torque change of the engine in the future from the present time with sufficient accuracy. By setting the target motor torque based on the torque of the engine after the setup time, which is estimated with high accuracy, the torque response of the engine synchronizes with the torque response of the motor, and the torque of the vehicle coincides with the target torque with sufficient accuracy. The driving force control device can eliminate or substantially eliminate the deviation of the actual torque from the target torque, while suppressing the response delay of the torque change with respect to the accelerator operation.

The controller may shorten a delay time of the torque change as the engine speed increases, and set the delay time to zero when the engine speed is higher than a reference engine speed The delay time after the change of the amount of intake air into the cylinder until the change in the torque of the engine becomes shorter, as the engine speed increases. By shortening the delay time related to the torque change as the engine speed increases, the accuracy of the estimation of the engine torque in the future from the present time is improved.

When the engine speed is sufficiently high, the delay time related to the torque change becomes very short, which reduces the necessity of intentionally setting the delay time. Thus, when the engine speed is higher than the reference engine speed, the controller can estimate the torque of the engine with sufficient accuracy, even if the delay time is set to zero.

Note that the response of the torque change of the engine becomes higher as the engine speed increases, and as a result, the response of the torque change of the engine becomes equivalent to the response of the torque change of the motor, or higher than the response of the torque change of the motor. When the engine speed is high, it is considered to make the torque response of the motor faster in order to synchronize the torque response of the engine with the torque response of the motor. However, since the time required for the engine and the motor to make one revolution becomes shorter, the torque response of the engine substantially synchronizes with the torque response of the motor, even if the torque response of the motor is not made faster.

The controller may set the target motor torque so as to supplement a difference between the estimated torque of the engine and the target engine torque.

The motor can supplement the response delay of the engine.

The controller may estimate the torque of the engine after the setup time from the present time based on the estimated future amount of intake air and an optimal ignition timing defined based on an operating state of the engine.

Here, the optimal ignition timing may be, for example, MBT (Minimum advance for the Best Torque). When the controller sets the target engine torque based on the MBT, the engine operates at the best efficiency. The motor can assist the engine which operates at the best efficiency.

Further, for example, when a catalyst device of the engine is inactive, and the engine operates in an AWS (Accelerated Warm-up System) mode, the optimal ignition timing is retarded from the MBT. The optimal ignition timing is not limited to the MBT. In this case, the engine can achieve an early activation of the catalyst device. The motor can assist the engine, while the early activation of the catalyst device is achieved.

The controller may set the target motor torque higher than a minimum torque that is generatable by the motor. When the target motor torque is limited by the minimum torque, the controller may retard the ignition timing of the engine from the optimal ignition timing so that the torque of the engine is reduced.

The minimum torque generatable by the motor is generally defined by the temperature condition. Further, if the SOC of the battery is high, since the regenerative operation of the motor cannot be carried out, the minimum motor torque is decreased. The minimum generatable torque is also defined by the motor performance. The controller should set the target motor torque to be higher than the minimum torque generatable by the motor. When the target motor torque is limited by the minimum torque, the set target motor torque is relatively high. The total torque of the motor torque and the engine torque (i.e., the actual torque of the vehicle) may exceed the target torque.

When the target motor torque is limited by the minimum torque, the controller retards the ignition timing of the engine from the optimal ignition timing. Since the retard of the ignition timing decreases the engine torque, the torque of the vehicle exceeding the target torque can be avoided.

The controller may estimate a change in an opening of a throttle valve of the engine after an accelerator operation, based on the target engine torque, estimate an amount of air passing through the throttle valve based on a change in the estimated opening of the throttle valve and a pressure of an intake manifold of the engine, estimate an amount of air inside the intake manifold based on the estimated amount of air passing through the throttle valve, and estimate the future amount of intake air to the cylinder based on the estimated amount of air inside the intake manifold.

The change of the throttle valve opening after the accelerator operation can be estimated by identifying beforehand, for example, the mechanical characteristics of the throttle valve. When the throttle opening in the future from the present time can be estimated, the amount of air which passes through the throttle valve in the future from the present time can be estimated by using the Bernoulli's equation based on the pressure of the intake manifold downstream of the throttle valve and the intake pressure upstream of the throttle valve. Note that as for the pressure of the intake manifold, a value obtained by converting the amount of air inside the intake manifold into the pressure is used, as will be described later. Further, for example, a pressure sensor may measure the intake pressure upstream of the throttle valve.

When the amount of air which passes through the throttle valve can be estimated, the amount of air inside the intake manifold can be estimated. When the amount of air inside the intake manifold can be estimated, the amount of intake air to the cylinder can be estimated. The controller can estimate the amount of intake air to the cylinder in the future from the present time.

The controller may estimate a change in an open-and-close timing of an intake valve of the engine after the accelerator operation based on the target engine torque, estimate a charging efficiency based on the estimated open-and-close timing of the intake valve, and estimate the amount of intake air to the cylinder based on the estimated charging efficiency and the estimated amount of air inside the intake manifold.

The change of the open-and-close timing of the intake valve after the accelerator operation can be estimated by identifying beforehand characteristics (including, for example, mechanical characteristics) of a valve mechanism which changes the open-and-close timing of the intake valve. Further, as for the engine, by identifying beforehand a relationship between the open-and-close timing of the intake valve, the operating state of the engine, and the charging efficiency, the controller can estimate the charging efficiency based on the estimated open-and-close timing.

When the charging efficiency can be estimated, the amount of intake air to the cylinder can be estimated with higher accuracy, based on the amount of air inside the intake manifold and the charging efficiency as described above. The controller can estimate a future amount of intake air to the cylinder from the present time with sufficient accuracy.

DETAILED DESCRIPTION OF THE DISCLOSURE

Hereinafter, one embodiment of a driving force control device for a vehicle is described with reference to the accompanying drawings. The driving force control device described herein is an illustrative example.

(Hybrid Vehicle)

Figure 1:
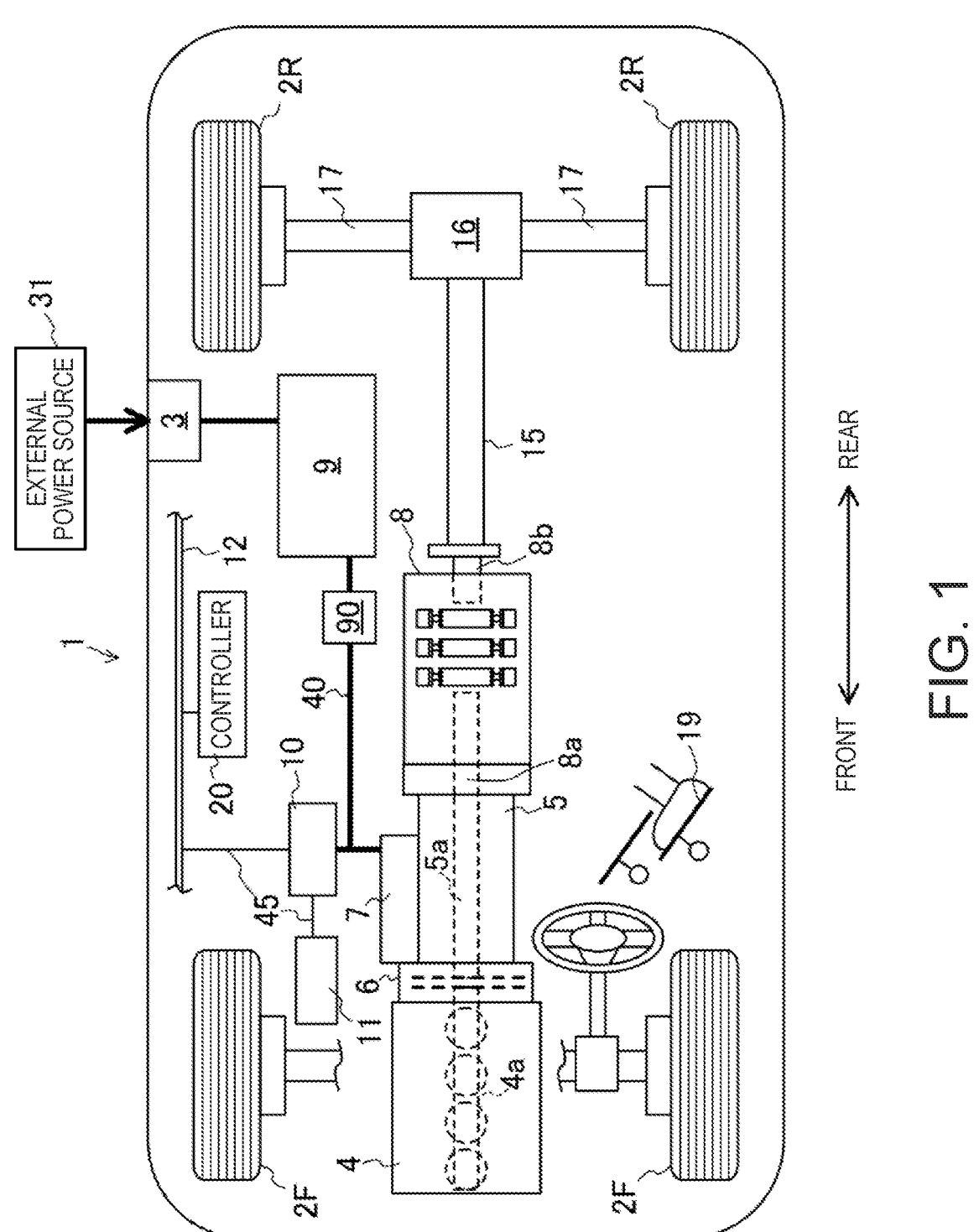
FIG. 1 illustrates a hybrid vehicle.

An automobile 1 (one example of the vehicle) to which the disclosed technology is applied is illustrated in FIG. 1. This automobile 1 is a hybrid vehicle which is travelable using electric power (or propellable by electric power). The automobile 1 has a total of four wheels, comprised of front wheels 2F and rear wheels 2R.

An engine 4 and a motor 5 are mounted on the automobile 1 as driving sources. These collaborate with each other to drive the rear wheels 2R. Thus, the automobile 1 travels. The automobile 1 is a rear-wheel drive vehicle. The motor 5 is used not only as the driving source but also as a generator during regeneration.

This automobile 1 carries a high-voltage battery 9. By the electric power supply from the high-voltage battery 9, the motor 5 generates torque for the traveling of the automobile 1. The high-voltage battery 9 is connected with an external power source 31 via a charging port 3. The high-voltage battery 9 is charged by the external power source 31. The automobile 1 is a so-called plug-in hybrid vehicle. Note that the automobile 1 may be a hybrid vehicle from which the charging port 3 is omitted.

In this automobile 1, the engine 4 is disposed at a front part of the vehicle body, and the driving wheels are disposed in a rear part of the vehicle body. That is, this automobile 1 is a so-called front-engine, rear-wheel drive (FR) vehicle.

The automobile 1 is provided with, in addition to the engine 4 and the motor 5, a K0 clutch 6, an inverter 7, and an automatic transmission 8, as devices in a drive system. The automobile 1 is also provided with a controller 20, as a device in a control system.

(Devices in Drive System)

The engine 4 is an internal combustion engine which combusts, for example, fossil fuel. Further, the engine 4 is a so-called four-cycle engine which generates a rotational motive force by repeating a cycle of intake, compression, expansion, and exhaust.

The engine 4 is a spark-ignition engine. Note that the engine 4 may be a compression-ignition engine. The engine 4 has a plurality of cylinders. Note that the number of cylinders of the engine 4 is not limited to a specific number.

In this automobile 1, the engine 4 is disposed substantially in a center part in the vehicle width direction in a state where a crankshaft 4a which outputs the rotational motive force is oriented in the front-and-rear direction of the vehicle body. In the automobile 1, various devices and mechanisms associated with the engine 4, such as an intake system, an exhaust system, a fuel feed system, and an ignition system, are installed. The engine 4 will be described later.

The motor 5 is a permanent-magnet synchronous motor which is driven by three-phase alternate current. The motor 5 is disposed in series with and behind the engine 4 via the K0 clutch 6. Further, the motor 5 is disposed in series with and in front of the automatic transmission 8.

The K0 clutch 6 is installed so that it intervenes between a front end part of a shaft 5a of the motor 5 and the crankshaft 4a of the engine 4. The K0 clutch 6 switches between a state where the crankshaft 4a is coupled to the shaft 5a (engaged state), and a state where the crankshaft 4a is disengaged from the shaft 5a (disengaged state).

A rear end part of the shaft 5a of the motor 5 is coupled to an input shaft 8a of the automatic transmission 8. Therefore, the engine 4 is coupled to the automatic transmission 8 via the K0 clutch 6 and the shaft 5a. By changing the K0 clutch 6 into the disengaged state, the engine 4 is disengaged from the automatic transmission 8.

While the automobile 1 travels, the K0 clutch 6 is switched between the engaged state and the disengaged state. For example, when the automobile 1 slows down, the K0 clutch 6 may be switched to the disengaged state, and regeneration in the state where the engine 4 is disengaged may be performed.

The motor 5 is connected with the high-voltage battery 9 which is mounted as a driving power source, via the inverter 7 and a high-voltage cable 40. A contactor 90 intervenes in the high-voltage cable 40.

The high-voltage battery 9 supplies high-voltage direct current power to the inverter 7. The inverter 7 converts the direct current power into three-phase alternate current, and supplies it to the motor 5. Therefore, the motor 5 rotates. Further, the motor 5 supplies regeneration energy to the high-voltage battery 9.

The high-voltage battery 9 is also connected with a DC-DC converter 10 via the high-voltage cable 40. The DC-DC converter 10 converts the high-voltage direct current power into low-voltage direct current power (12V), and outputs it. The DC-DC converter 10 (its output side) is connected with a low voltage battery 11 (a so-called lead storage battery) via a low-voltage cable 45.

The low-voltage battery 11 is connected with various electronic auto parts via the low-voltage cable 45. The DC-DC converter 10 is also connected with a CAN (Controller Area Network) 12 via the low-voltage cable 45. Therefore, the DC-DC converter 10 supplies the low-voltage direct current power to the CAN 12.

The automatic transmission 8 is a multistage automatic transmission (so-called "AT"). The automatic transmission 8 has the input shaft 8a at a front end part thereof, and this input shaft 8a is coupled to the shaft 5a of the motor 5 as described above. The automatic transmission 8 has an output shaft 8b at a rear end part thereof, which rotates independently from the input shaft 8a.

Between the input shaft 8a and the output shaft 8b, a transmission mechanism comprised of a plurality of planetary gear mechanisms and a plurality of friction engagement elements is incorporated. Each friction engagement element is switched hydraulically between an engaged state and a disengaged state. The automatic transmission 8 selectively engages the plurality of friction engagement elements by a hydraulic control. The gear stage of the automatic transmission 8 is switched to any one of forward gear stages from a first gear stage to an eighth gear stage, and a reverse gear stage.

Note that if an element to be engaged in each gear stage is not engaged, the input shaft 8a and the output shaft 8b become in a disengaged state (so-called neutral). Even if the rotational motive force is inputted into the automatic transmission 8 from the driving source, this rotational motive force is not outputted from the automatic transmission 8.

As illustrated in FIG. 1, the output shaft 8b of the automatic transmission 8 is coupled to a differential gear 16 via a propeller shaft 15 extending in the front-and-rear direction of the vehicle body. The differential gear 16 is coupled to a pair of drive shafts 17 which extend in the vehicle width direction and are coupled to the left and right rear wheels 2R. The rotational motive force outputted through the propeller shaft 15 is divided by the differential gear 16, and the divided forces are then transmitted to the rear wheels 2R through the pair of drive shafts 17, respectively.

(Engine)

Figure 2:
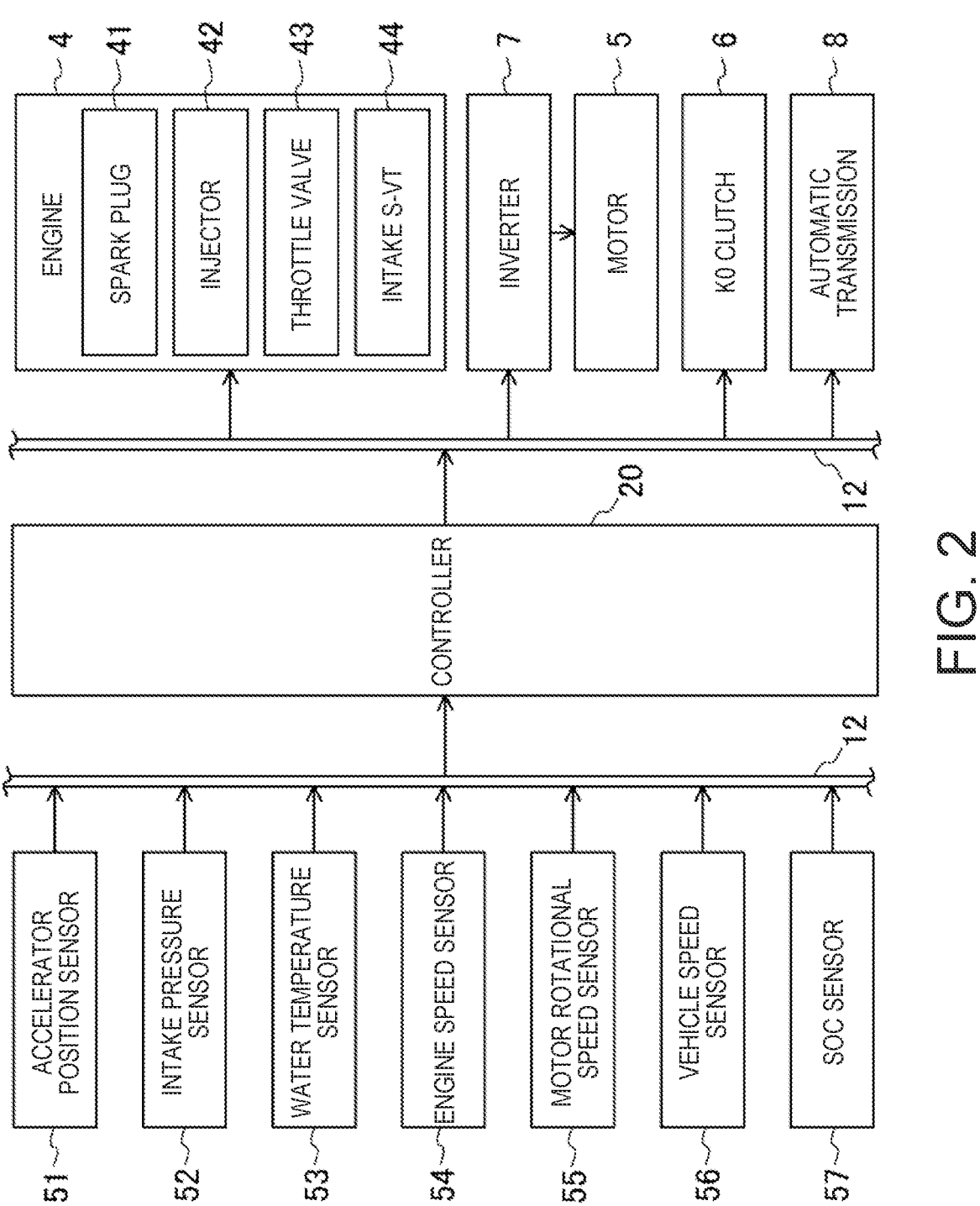
FIG. 2 is a block diagram of a driving force control device.

As illustrated in FIG. 2, the engine 4 includes a spark plug 41, an injector 42, a throttle valve 43, and an intake S-VT (Sequential-Valve Timing) 44.

The spark plug 41 is attached to the engine 4. The spark plug 41 forcibly ignites a mixture gas inside a cylinder in response to a control signal from the controller 20.

The injector 42 is attached to the engine 4. The injector 42 injects fuel, for example, into the cylinder in response to a control signal from the controller 20. The fuel and air which is taken into the cylinder form the mixture gas.

The throttle valve 43 is a butterfly valve attached to an intake passage of the engine 4. The throttle valve 43 changes its opening in response to a control signal from the controller 20. When the opening of the throttle valve 43 changes, an amount of air taken into the cylinder changes. As the opening of the throttle valve 43 increases, the amount of intake air increases. As the opening of the throttle valve 43 decreases, the amount of intake air decreases.

The intake S-VT 44 changes an open-and-close timing of the intake valve, for example, continuously. The intake S-VT 44 is a hydraulically driven type or an electrically driven type. The intake S-VT 44 changes the open-and-close timing of the intake valve in an advancing direction or a retarding direction in response to a control signal from the controller 20. When the intake S-VT 44 changes the open-and-close timing of the intake valve, the charging efficiency changes. A combination of the change in the opening of the throttle valve 43 and the change in the open-and-close timing of the intake valve changes the amount of intake air into the cylinder.

(Driving Force Control Device)

FIG. 2 is a block diagram of the driving force control device. The controller 20 described above is installed in the automobile 1 in order to control the engine 4, the motor 5, the K0 clutch 6, the automatic transmission 8, etc. according to operation of the driver to control the traveling of the automobile 1. The controller 20 is comprised of hardware, such as a processor, memory, and an interface, and software, such as a database and a control program. Note that although a sole controller 20 is illustrated in the driving force control device of FIG. 2, the controller of the driving force control device may be divided into a module (powertrain control module (PCM)) for mainly controlling operation of the driving sources (the engine 4 and the motor 5), and a module (transmission control module (TCM)) for mainly controlling operation of the K0 clutch 6 and the automatic transmission 8. The PCM and the TCM are connected with each other via the CAN 12 and are configured to be telecommunicatable with each other.

The driving force control device is provided with a sensor which measures various kinds of parameters related to the traveling of the vehicle. Concretely, the driving force control device includes an accelerator position sensor 51, an intake pressure sensor 52, a water temperature sensor 53, an engine speed sensor 54, a motor rotational speed sensor 55, a vehicle speed sensor 56, and an SOC sensor 57.

The accelerator position sensor 51 outputs a signal corresponding to operation of an accelerator pedal 19 (see FIG. 1) which is operated by the driver.

The intake pressure sensor 52 outputs a signal corresponding to a pressure at a part of the intake passage of the engine 4, upstream of the throttle valve 43. The water temperature sensor 53 outputs a signal corresponding to a temperature of coolant of the engine 4.

The engine speed sensor 54 outputs a signal corresponding to an engine speed of the engine 4. The motor rotational speed sensor 55 outputs a signal corresponding to a rotational speed of the motor 5. Note that in the automobile 1, when the K0 clutch 6 is in the connected state and each of the engine 4 and the motor 5 outputs a torque, the engine speed of the engine 4 coincides with the rotational speed of the motor 5.

The vehicle speed sensor 56 outputs a signal corresponding to a traveling speed of the automobile 1 (vehicle speed). The SOC sensor 57 outputs a signal corresponding to an SOC of the high-voltage battery 9.

The controller 20 receives these signals outputted from the sensors via the CAN 12. The controller 20 outputs the control signal to the engine 4, the inverter 7, the K0 clutch 6, and the automatic transmission 8 through the CAN 12. Thus, the controller 20 controls the engine 4, the motor 5, the K0 clutch 6, and the automatic transmission 8.

(Details of Driving Force Control)

Figure 3:
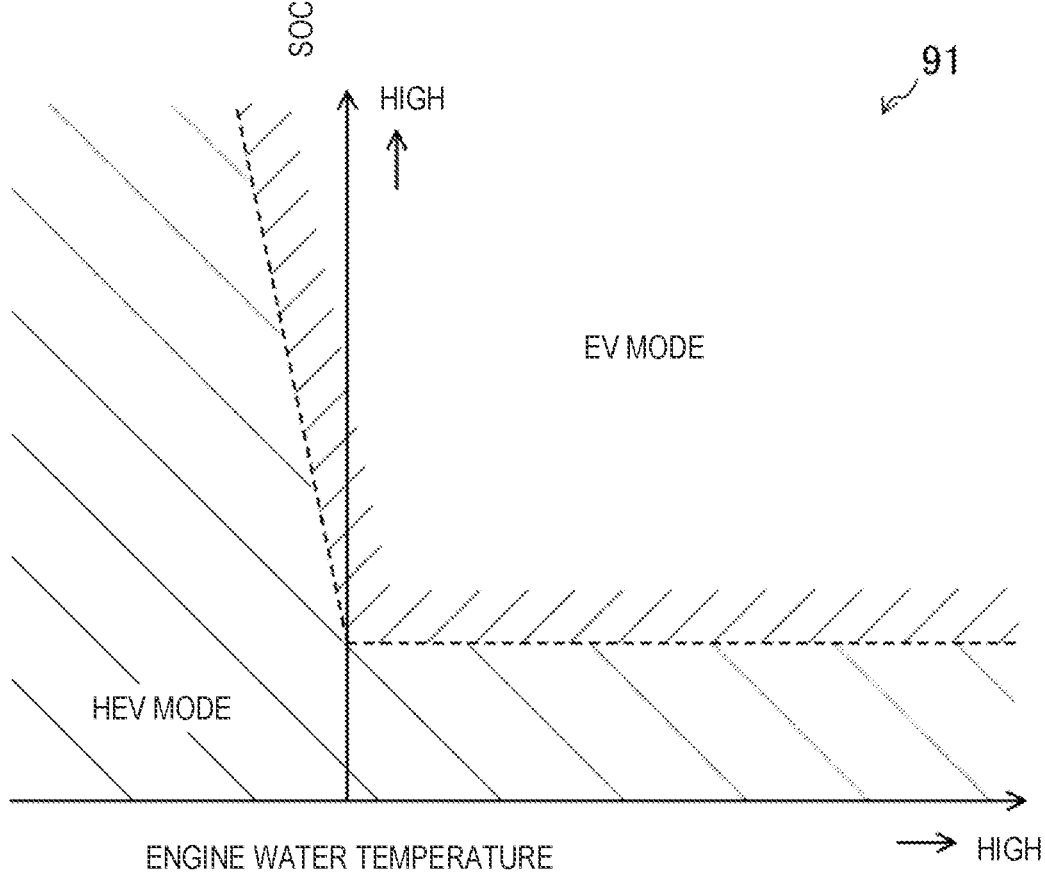
FIG. 3 illustrates a map according to a mode of the hybrid vehicle.

FIG. 3 illustrates a map 91 according to the mode of the automobile 1. The automobile 1 has an EV mode and an HEV mode. The EV mode is an "Electric Vehicle" mode, and is a mode in which only the motor 5 outputs torque for the traveling of the automobile 1. The HEV mode is a "Hybrid Electric Vehicle" mode, and is a mode in which both the engine 4 and the motor 5 output torque for the traveling of the automobile 1. When the engine water temperature is comparatively high and the SOC of the high-voltage battery 9 is comparatively high, the automobile 1 is in the EV mode. Fuel efficiency improves by using the electric power of the high-voltage battery 9. When the engine water temperature is low, the automobile 1 is in the HEV mode. Utilizing the coolant of the engine which is increased in the temperature by the operation of the engine 1, heating inside a vehicle cabin is performed. Thus, the energy efficiency of the automobile 1 improves. When the SOC of the high-voltage battery 9 is comparatively low, the automobile 1 is in the HEV mode. The operation of the engine 1 charges the high-voltage battery 9, while reducing the power consumption of the high-voltage battery 9. Thus, the SOC of the high-voltage battery 9 is recovered.

The controller 20 stores the map 91. The controller 20 switches, according to the map 91, between distributing a target torque of the automobile 1 to both a target engine torque and a target motor torque (i.e., the HEV mode), and distributing the target torque of the automobile 1 only to the target motor torque (i.e., the EV mode).

Here, in this automobile 1, fundamentally, an ignition timing of the engine 4 in the HEV mode is MBT (Minimum Advance for Best Torque). Thus, the engine 4 operates at the best efficiency. The motor 5 assists the engine 4 which operates at the best efficiency.

Note that when a catalyst device of the engine 4 is inactive, and the engine 4 operates in an AWS (Accelerated Warm-up System) mode, the ignition timing is retarded from the MBT. Therefore, an exhaust loss increases. In the AWS mode, the engine 4 can achieve an early activation of the catalyst device by using the exhaust loss. The motor 5 assists the engine 4 which activates the catalyst device.

Figure 4:
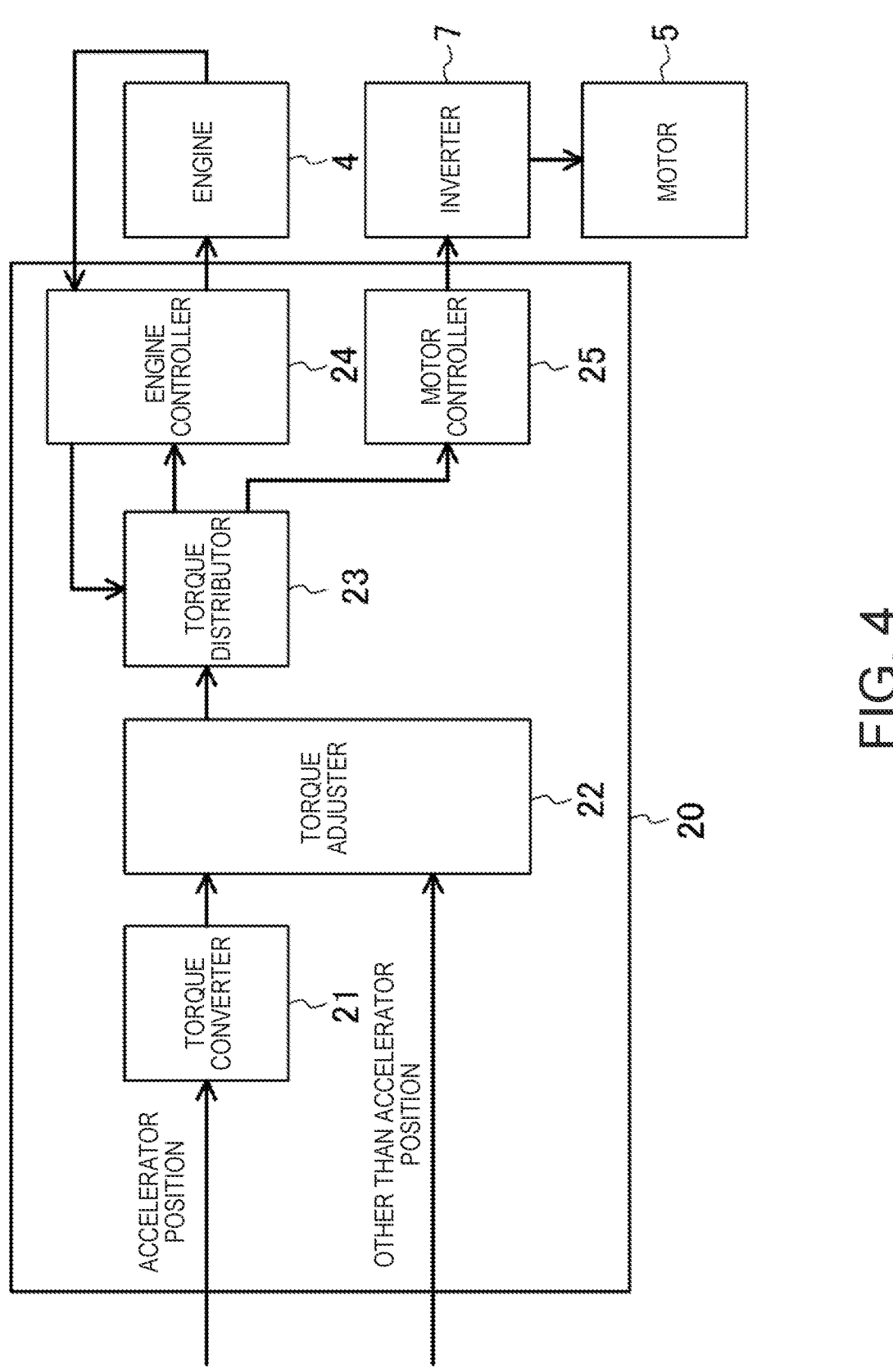
FIG. 4 illustrates functional blocks of a controller.

Next, the distribution of the torque to the engine 4 and the motor 5 in the HEV mode is described with reference to FIGS. 4 to 7. FIG. 4 illustrates functional blocks of the controller 20. The controller 20 includes a torque converter 21, a torque adjuster 22, a torque distributor 23, an engine controller 24, and a motor controller 25, as functional blocks.

The torque converter 21 sets the target torque of the automobile 1 based on an accelerator position in response to the signal from the accelerator position sensor 51. In more detail, the torque converter 21 sets a target acceleration of the automobile 1 based on the driver's accelerator operation, and converts the set target acceleration into a target torque (i.e., the target torque of the automobile 1) based on the vehicle speed of the automobile 1 and the gear stage of the automatic transmission 8.

The torque adjuster 22 receives the target torque set by torque converter 21 based on the accelerator position, and sets a final target torque in response to a torque demand signal other than the accelerator position. The torque demand signal other than the accelerator position includes a torque demand signal for stabilizing the behavior of the automobile 1, for example.

The torque distributor 23 distributes the target torque to a target engine torque and a target motor torque in response to the final target torque which is the target torque of the automobile 1 set by the torque adjuster 22. Note that when the automobile 1 is in the EV mode, the target engine torque is zero, and the target motor torque coincides with the target torque of the automobile 1. The torque distributor 23 will be described later in detail.

The engine controller 24 outputs a control signal corresponding to the target engine torque set by the torque distributor 23 to the engine 4 (in more detail, the spark plug 41, the injector 42, the throttle valve 43, and the intake S-VT 44). The engine 4 operates so that the target engine torque is realized.

The motor controller 25 outputs a control signal corresponding to the target motor torque set by the torque distributor 23 to the inverter 7. The motor 5 is controlled through the inverter 7. The motor 5 operates so that the target motor torque is realized. By the engine 4 outputting the torque and the motor 5 outputting the torque, the target torque of the automobile 1 is achieved.

Figure 5:
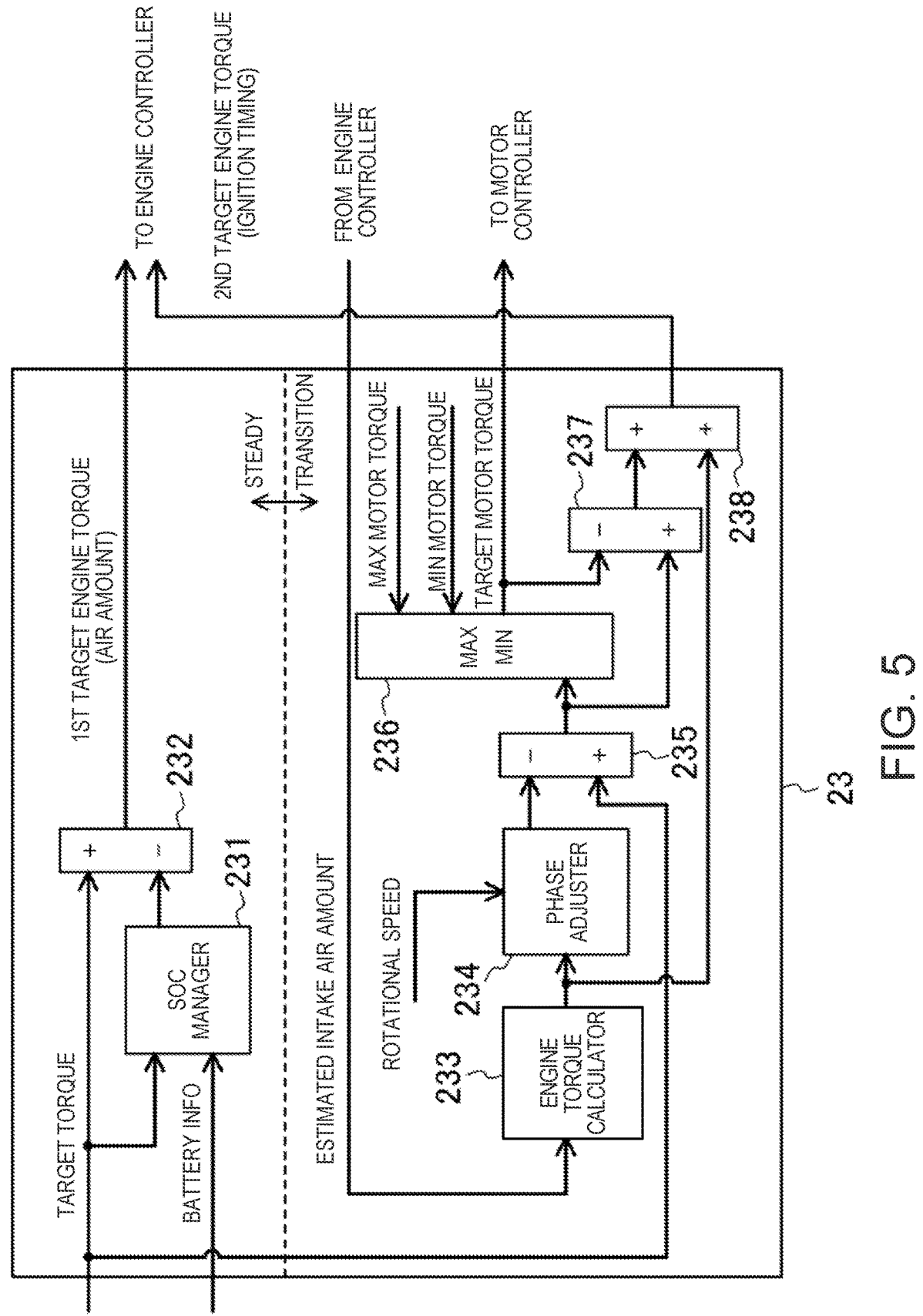
FIG. 5 illustrates functional blocks of a torque distributor.

FIG. 5 illustrates functional blocks of the torque distributor 23. The torque distributor 23 includes an SOC manager 231, a first adder subtracter 232, an engine torque calculator 233, a phase adjuster 234, a second adder subtracter 235, a limiter 236, a third adder subtracter 237, and an adder 238, as functional blocks.

The SOC manager 231 receives the final target torque of the automobile 1 set by the torque adjuster 22. The SOC manager 231 also receives information on the high-voltage battery 9. The information on the high-voltage battery 9 includes at least the SOC of the high-voltage battery 9 based on a measurement signal from the SOC sensor 57, and a temperature of the high-voltage battery 9. The SOC manager 231 temporarily sets a target torque of the motor 5 based on the target torque of the automobile 1 and the battery information. For example, when the SOC is high, the SOC manager 231 increases the target motor torque to increase an amount of the assistance to the engine 4 by the motor 5. For example, when the SOC is low, the SOC manager 231 decreases the target motor torque to give priority to the charging of the high-voltage battery 9. The target motor torque set here is equivalent to a steady target motor torque.

The first adder subtracter 232 subtracts the target motor torque set by the SOC manager 231 from the target torque of the automobile 1. The output of the first adder subtracter 232 is a first target engine torque. The first target engine torque is equivalent to a steady target engine torque. The first target engine torque can also be described as a torque achieved by adjusting the amount of air into the cylinder. The torque distributor 23 outputs the first target engine torque to the engine controller 24.

When the driver operates the accelerator pedal 19, the target torque of the automobile 1 changes. When the target torque of the automobile 1 changes, the target engine torque and the target motor torque change. When the target engine torque changes, a target throttle opening and a target open-and-close timing of the intake valve are changed to change the amount of intake air into the cylinder. The change in the opening of the throttle valve 43 and/or the change in the open-and-close timing of the intake valve by the intake S-VT 44 take time, and it also takes time to actually change the amount of intake air into the cylinder after the opening of the throttle valve 43 and the open-and-close timing of the intake valve are changed. Further, it also takes time to actually change the torque of the engine 4 after the amount of intake air into the cylinder is actually changed. A time lag arises between the time the driver operates the accelerator pedal 19 and the time the torque of the engine 4 is changed to the target engine torque.

The torque distributor 23 sets the target motor torque so that the slow torque response of the engine 4 is supplemented. In more detail, the torque distributor 23 estimates a future amount of intake air to the cylinder from the present time, and estimates a torque of the engine 4 in the future based on the estimated future amount of intake air. The torque distributor 23 sets the target motor torque based on the estimated torque of the engine 4 so that the target torque of the automobile 1 will be achieved in the future.

During a transition where the target torque changes, the SOC manager 231 and the first adder subtracter 232 of the torque distributor 23 are related to a setup of the steady target engine torque (i.e., the first target engine torque). The engine torque calculator 233, the phase adjuster 234, the second adder subtracter 235, the limiter 236, the third adder subtracter 237, and the adder 238 are related to a setup of a transitional target engine torque (a second target engine torque which will be described later), and a setup of the target motor torque.

The engine torque calculator 233 reads the estimated value of the amount of intake air into the cylinder in the future from the present time. The estimation of the amount of intake air is performed by the engine controller 24, as will be described later. The engine controller 24 outputs the estimated value of the amount of intake air after a reference time which is defined beforehand with respect to the present time. The engine torque calculator 233 estimates the torque of the engine 4 in the future from the present time based on the estimated value of the amount of intake air. In more detail, the engine torque calculator 233 estimates the torque of the engine 4 when the spark plug 41 ignites at an optimal ignition timing which is defined based on the operating state of the engine 4, based on the estimated value of the amount of intake air.

Here, one example of the optimal ignition timing is the MBT described above. That is, the engine torque calculator 233 estimates the torque of the engine 4 when the spark plug 41 ignites at the MBT, based on the estimated value of the amount of intake air. Further, when the engine operates in the AWS mode, the optimal ignition timing is a timing which is retarded from the MBT. That is, the engine torque calculator 233 may estimate the torque of the engine 4 when the spark plug 41 ignites at the timing retarded from the MBT, based on the estimated value of the amount of intake air.

The phase adjuster 234 synchronizes the torque change of the engine 4 with the torque change of the motor 5, for example, in consideration of a communication delay of the controller 20, a response delay of the motor 5, and a response delay of the engine 4. Generally, the torque response of the engine 4 is slower than the torque response of the motor 5. The phase adjuster 234 adjusts a phase of the torque estimated value of the engine 4 in consideration of a torque response difference between the motor 5 and the engine 4.

Here, the torque response of the engine 4 changes according to the engine speed of the engine 4. That is, when the engine speed of the engine 4 is high, a combustion interval (i.e., a time interval) of the plurality of cylinders of the engine 4 is short. When the engine speed of the engine 4 is low, the combustion interval (i.e., the time interval) of the plurality of cylinders is long. A time after the amount of intake air into the cylinder changes until the torque of the engine 4 changes varies according to the engine speed of the engine 4. When the engine speed of the engine 4 is high, the time after the amount of intake air into the cylinder changes until the torque of the engine 4 changes is short. When the engine speed of the engine 4 is low, the time after the amount of intake air into the cylinder changes until the torque of the engine 4 changes is long.

The engine controller 24 estimates the amount of intake air after the reference time (i.e., a fixed time) with respect to the present time. The period of time required for reflecting the amount of intake air after the reference time to the torque of the engine 4 varies according to the engine speed of the engine 4.

Figure 7:
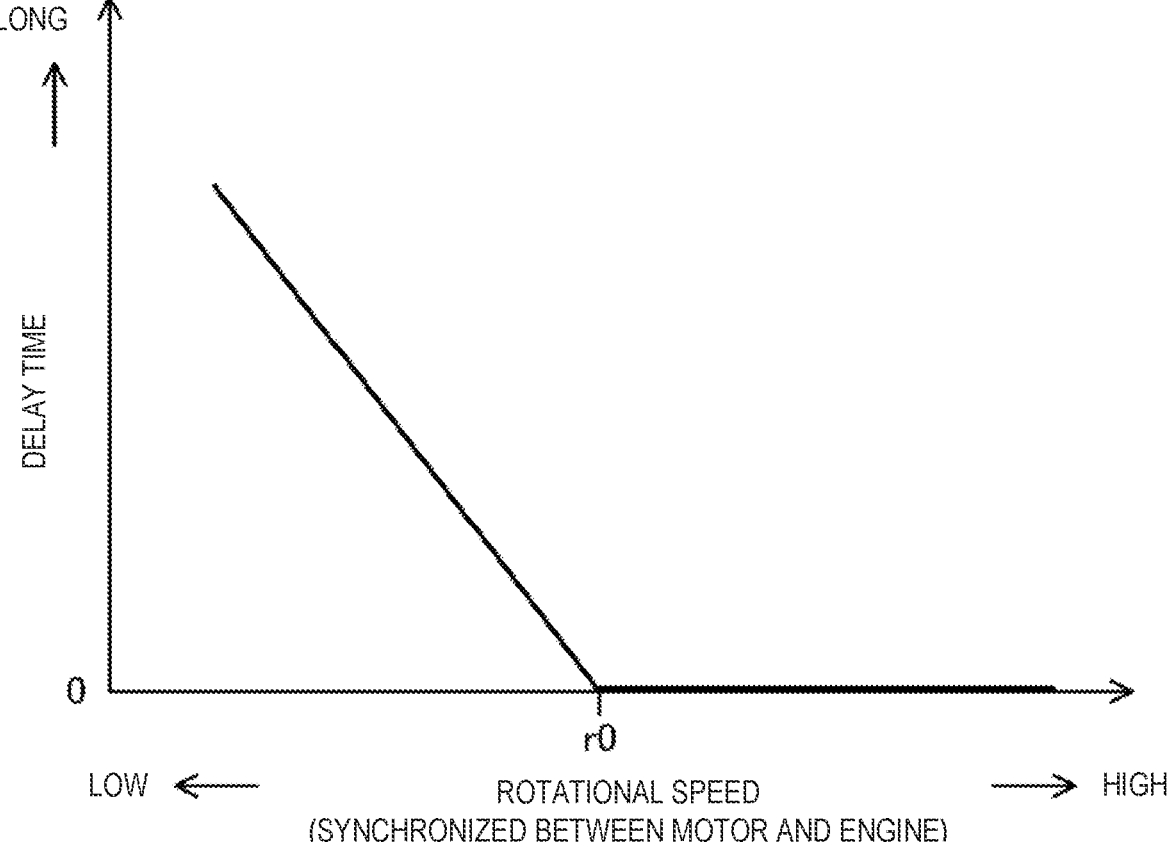
FIG. 7 illustrates a relationship between an engine speed and a delay time.

FIG. 7 illustrates a relationship between the engine speed and the delay time. The delay time corresponds to a delay from the change in the amount of intake air to the torque change of the engine 4. When the engine speed is low, the period of time required for reflecting the change in the amount of intake air to the torque change of the engine 4 is long. Thus, when the engine speed is low, the delay time is long. When the engine speed is high, the delay time is short. In FIG. 7, the relationship between the engine speed and the delay time is set to be linear so that the delay time becomes shorter as the engine speed increases. The controller 20 stores the relational expression illustrated in FIG. 7. Note that the relationship between the engine speed and the delay time is not limited to the illustrated example. The relationship between the engine speed and the delay time may be a curve, without being limited to the straight line. Further, the relationship between the engine speed and the delay time may be stepwise.

The phase adjuster 234 sets the delay time based on the engine speed. The estimated amount of intake air is reflected to the torque of the engine 4 after the delay time. The controller 20 estimates the torque of the engine 4 after the setup time from the present time. The setup time related to the torque estimation can be set as an arbitrary period of time, as long as it is a time after the reference time related to the estimation of the amount of intake air.

When the engine speed of the engine 4 exceeds a reference engine speed r0, the delay time becomes zero. If the engine speed of the engine 4 becomes higher than the reference engine speed r0, since the response of the torque change of the engine 4 to the accelerator operation is sufficiently high, it is not necessary to provide the delay time. Thus, when the engine speed of the engine 4 is higher than the reference engine speed, the controller 20 can estimate the torque of the engine 4 with sufficient accuracy, even if the delay time is set to zero.

Note that if the engine speed of the engine 4 becomes higher than the reference engine speed, the torque response of the engine 4 becomes equivalent to the torque response of the motor 5, or the torque response of the motor 5 becomes slower than the torque response of the engine 4. Thus, when the engine speed of the engine 4 is high, it is considered to make the torque response of the motor 5 faster in order to synchronize the torque response of the engine 4 with the torque response of the motor 5. However, if the engine speed of the engine 4 increases, since the time required for the engine 4 and the motor 5 making one revolution becomes shorter, the torque response of the engine 4 substantially synchronizes with the torque response of the motor 5, even if the torque response of the motor 5 is not made faster.

When the torque of the engine 4 after the setup time from the present time is estimated, the second adder subtracter 235 subtracts it from the target torque of the automobile 1. The estimated torque of the engine 4 after the setup time includes the delay of the torque response of the engine 4. If the output of the second adder subtracter 235 is the target motor torque after the setup time from the present time, the target torque of the automobile 1 can be achieved by adding the motor torque to the estimated torque of the engine 4. That is, the target motor torque supplements the delay of the torque response of the engine 4.

The limiter 236 outputs a final target motor torque based on the target motor torque outputted from the second adder subtracter 235, a maximum torque of the motor 5, and a minimum torque. Here, the maximum motor torque and the minimum motor torque are set according to the performance of the motor 5, the temperature of the motor 5, and/or the SOC of the high-voltage battery 9. For example, if the SOC is high, since the regenerative operation of the motor 5 cannot be carried out, the minimum motor torque is set to small. If the SOC is low, since the high-voltage battery 9 has to be charged, the maximum motor torque is set to small. When the target motor torque outputted from the second adder subtracter 235 exceeds the maximum motor torque, the limiter 236 sets the target motor torque to the maximum motor torque. When the target motor torque outputted from the second adder subtracter 235 is less than the minimum motor torque, the limiter 236 sets the target motor torque to the minimum motor torque. When the target motor torque outputted from the second adder subtracter 235 is below the maximum motor torque and is more than the minimum motor torque, the limiter 236 sets the target motor torque outputted from the second adder subtracter 235 as the final target motor torque.

The motor controller 25 controls the motor 5 through the inverter 7 based on the target motor torque outputted from the limiter 236. As described above, the motor 5 supplements the engine 4 so that the target torque of the automobile 1 after the setup time from the present time is achieved, and outputs the torque. While suppressing the response delay of the torque change with respect to the driver's operation of the accelerator pedal 19, the torque change of the engine 4 is synchronized with the torque change of the motor 5, and the deviation of the actual torque from the target torque is suppressed.

Here, when the target motor torque is limited by the minimum motor torque in the limiter 236, the target motor torque outputted from the limiter 236 is larger than the target motor torque outputted from the second adder subtracter 235. If the motor 5 keeps outputting the target motor torque (i.e., the minimum motor torque) as the engine 4 keeps outputting the target engine torque, the torque of the automobile 1 after the setup time from the present time will exceed the target torque.

The third adder subtracter 237 calculates a difference between the target motor torque outputted from the second adder subtracter 235 and the target motor torque outputted from the limiter 236. When the difference is zero, the limiter 236 does not limit the target motor torque by the maximum motor torque or the minimum motor torque. When the difference is not zero, the limiter 236 limits the target motor torque by the maximum motor torque or the minimum motor torque.

The adder 238 sets the second target engine torque by adding the output of the third adder subtracter 237 to the output of the engine torque calculator 233. The adder 238 outputs the second target engine torque to the engine controller 24. The output of the third adder subtracter 237 is the above-described difference, and the output of the engine torque calculator 233 is the torque of the engine 4 estimated from the estimated value of the amount of intake air. The second target engine torque is related to adjustment of the ignition timing. Concretely, when the target motor torque is limited by the minimum motor torque, the ignition timing is retarded from the optimal ignition timing (i.e., the MBT, or the ignition timing during the AWS) so that the torque of the engine 4 is reduced. The second target engine torque is the torque achieved by adjusting the ignition timing, and is equivalent to the transitional target engine torque.

The engine controller 24 controls the amount of intake air of the engine 4 and the ignition timing based on the first target engine torque and the second target engine torque. When the ignition timing is retarded according to the second target engine torque, the torque of the engine 4 is reduced. The amount of increase in the motor torque is canceled out by the torque reduction of the engine 4. By the torque of the engine 4 and the torque of the motor 5, the torque of the automobile 1 coincides with or substantially coincides with the target torque.

Note that when the target motor torque is limited by the maximum motor torque, the torque of the motor 5 is relatively lowered. Unless the torque of the engine 4 is raised, the target torque of the automobile 1 cannot be realized. However, under operation by using the optimal ignition timing, it is difficult to further raise the torque of the engine 4. When the target motor torque is limited by the maximum motor torque in the limiter 236, the adjustment of the ignition timing is not performed.

(Estimation of Amount of Intake Air of Engine)

Figure 6:
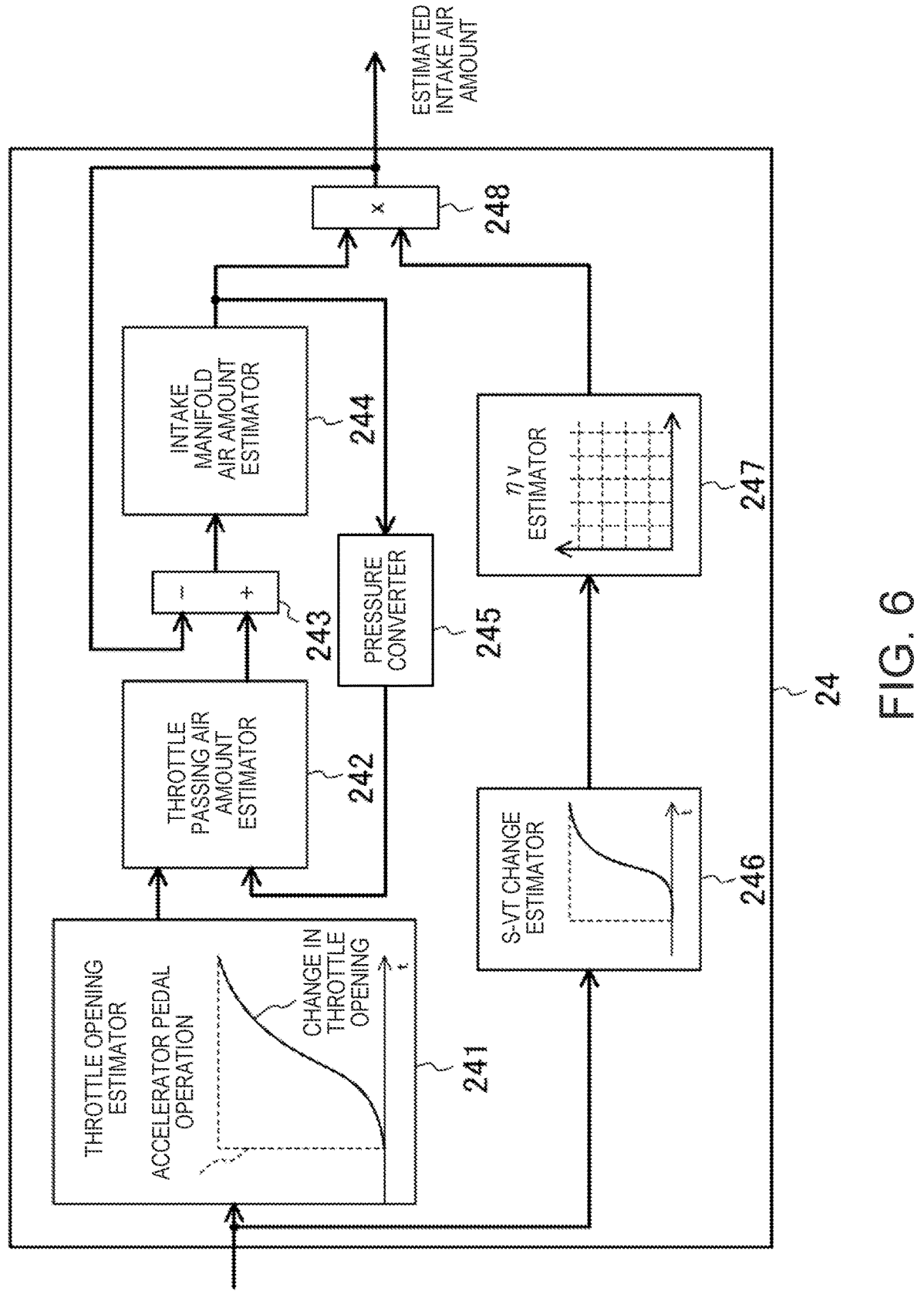
FIG. 6 illustrates functional blocks of an engine controller.

FIG. 6 illustrates functional blocks of the engine controller 24 related to the estimation of the amount of intake air. The engine controller 24 includes a throttle opening estimator 241, a throttle passing air amount estimator 242, a fourth adder subtracter 243, an intake manifold air amount estimator 244, a pressure converter 245, an S-VT change estimator 246, a charging efficiency estimator 247, and a multiplier 248. The engine controller 24 estimates the amount of intake air after the reference time from the present time. The reference time is a fixed period of time and is set beforehand. The reference time can be set arbitrarily, for example, between ten to several tens milliseconds.

The throttle opening estimator 241 estimates the change in the opening of the throttle valve 43 with the progress of time, based on the first target engine torque set by the torque distributor 23. The throttle opening estimator 241 estimates an opening of the throttle valve 43 after the reference time from the present time based on the target opening of the throttle valve 43 and characteristic information on the throttle valve 43. A relationship between the target engine torque and the target opening of the throttle valve 43 is stored in the controller 20. The characteristic information on the throttle valve 43 is also stored in the controller 20. The characteristics of the throttle valve 43 may be identified, for example, by performing an actual machine test. As illustrated in FIG. 6, the opening of the throttle valve 43 changes with a delay from the operation of the accelerator pedal 19.

The throttle passing air amount estimator 242 estimates an amount of air which passes through the throttle valve 43 after the reference time from the present time. In detail, the throttle passing air amount estimator 242 estimates the amount of air which passes through the throttle valve 43 by using Bernoulli's equation based on the opening of the throttle valve 43 estimated by the throttle opening estimator 241, a pressure of the intake manifold downstream of the throttle valve 43, and the intake pressure upstream of the throttle valve 43. As for the pressure of the intake manifold, a value obtained by the pressure converter 245 converting an amount of air inside the intake manifold after the reference time from the present time into the pressure is used, which will be described later. The intake pressure upstream of the throttle valve 43 can be acquired, for example, from the measurement signal of the intake pressure sensor 52.

The fourth adder subtracter 243 subtracts the amount of intake air into the cylinder (described later) from the amount of air passing through the throttle valve 43 after the reference time from the present time, which is estimated by the throttle passing air amount estimator 242.

The intake manifold air amount estimator 244 estimates the amount of air inside the intake manifold after the reference time from the present time based on the output from the fourth adder subtracter 243.

As described above, the pressure converter 245 converts the amount of air inside the intake manifold after the reference time from the present time, which is estimated by the intake manifold air amount estimator 244, into the pressure inside the intake manifold, and outputs it to the throttle passing air amount estimator 242.

The S-VT change estimator 246 estimates the change in the open-and-close timing of the intake valve by the intake S-VT 44 with the progress of time based on the first target engine torque, similarly to the throttle opening estimator 241. The S-VT change estimator 246 estimates the open-and-close timing of the intake valve after the reference time from the present time, based on the target open-and-close timing of the intake valve and the characteristic information on the intake S-VT 44. The relationship between the target engine torque and the target open-and-close timing of the intake valve is stored in the controller 20. The characteristic information on the intake S-VT 44 is also stored in the controller 20. The characteristics of the intake S-VT 44 may be identified, for example, by performing an actual machine test. As illustrated in FIG. 6, the open-and-close timing of the intake valve changes with a delay from the operation of the accelerator pedal 19.

The charging efficiency estimator 247 estimates a charging efficiency after the reference time from the present time based on the open-and-close timing of the intake valve after the reference time from the present time, which is estimated by the S-VT change estimator 246. The controller 20 stores beforehand a map indicative of a relationship between the open-and-close timing of the intake valve, the operating state of the engine 4, and the charging efficiency. The charging efficiency estimator 247 estimates the charging efficiency after the reference time from the present time based on the map stored in the controller 20.

The multiplier 248 estimates the amount of intake air into the cylinder after the reference time from the present time by multiplying the amount of air inside the intake manifold after the reference time from the present time, which is estimated by the intake manifold air amount estimator 244, by the charging efficiency after the reference time from the present time, which is estimated by the charging efficiency estimator 247. The estimated amount of intake air is used for the control of the engine 4, and is also outputted to the engine torque calculator 233 of the torque distributor 23 as described above.

(Example of Control)

Figure 8:
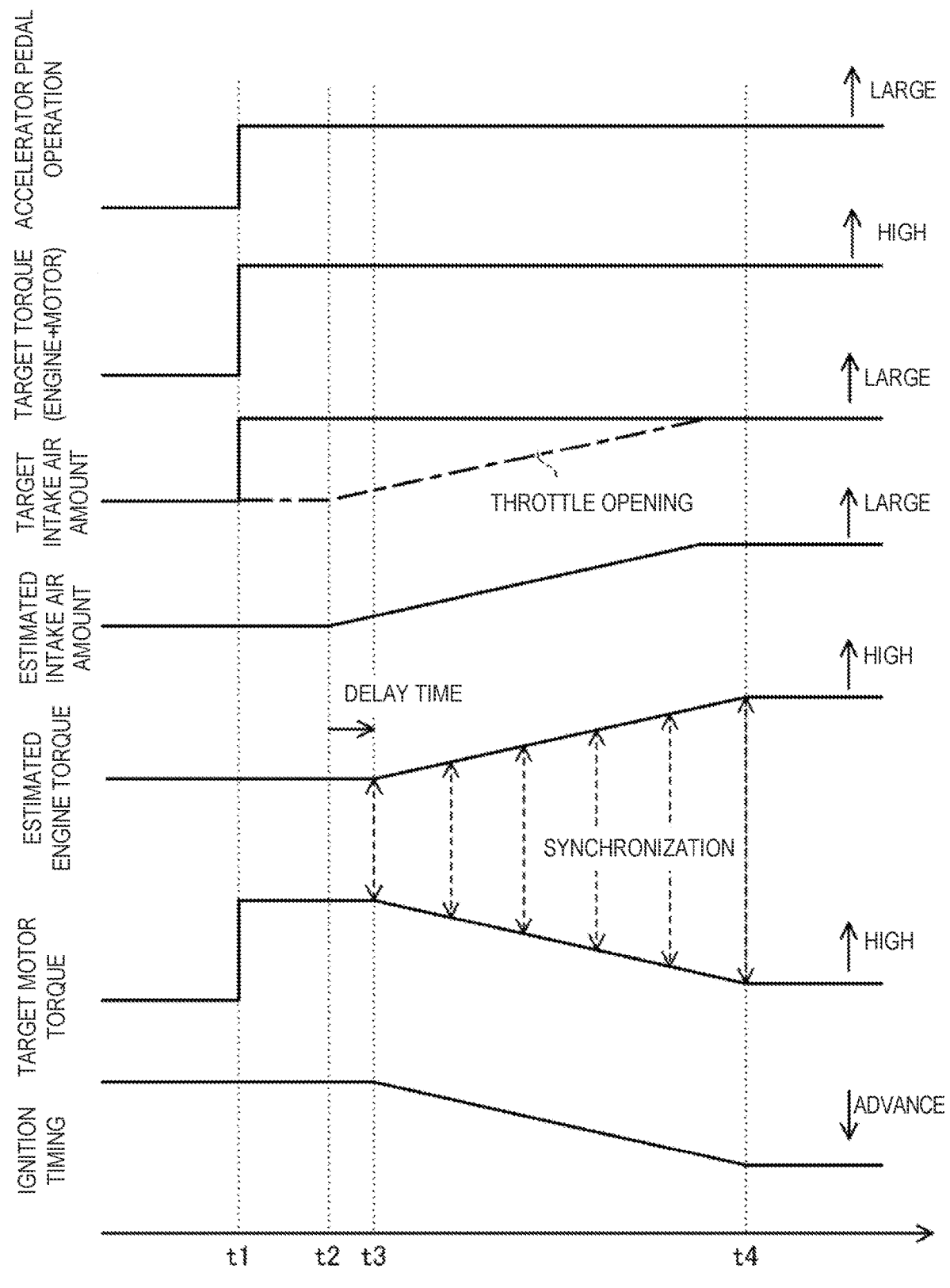
FIG. 8 illustrates a time chart of a driving force control.

FIG. 8 illustrates one example of the control by the driving force control device for the vehicle. The time chart of FIG. 8 includes operation of the accelerator pedal 19, a change in the target torque of the automobile 1, a change in the target amount of intake air, a change in the estimated amount of intake air, a change in the estimated engine torque value, a change in the target motor torque, and a change in the ignition timing. This example of control corresponds to a case where the automobile 1 is accelerated by the driver stepping on the accelerator pedal 19, while the automobile 1 travels in the HEV mode.

First, the driver steps on the accelerator pedal 19 at a time t1. The torque converter 21 and the torque adjuster 22 set the target torque of the automobile 1 so that it corresponds to the operation of the accelerator pedal 19. This target torque is a torque which is realized by the torque of the engine 4 and the torque of the motor 5. In the example of control of FIG. 8, the target torque increases in a stepwise manner at the time t1.

The torque distributor 23 sets the target engine torque so that it corresponds to the change in the target torque. The target engine torque increases in a stepwise manner similarly to the target torque. The target amount of intake air of the engine 4 is set so that it corresponds to the target engine torque. The target amount of intake air also increases in a stepwise manner at the time t1. The opening of the throttle valve 43 changes so that the target amount of intake air is realized. Since the change in the opening of the throttle valve 43 is delayed from the operation of the accelerator pedal 19 as described above, the throttle opening changes gradually with the progress of time as illustrated by a one-dot chain line in FIG. 8.

As described above, the engine controller 24 estimates a change in the throttle opening, and based on the estimation, it estimates the amount of intake air after the reference time from the present time. The estimated amount of intake air increases gradually with the progress of time from a time t2 which is after the time t1 so that it corresponds to the change in the throttle opening.

The engine torque calculator 233 of the torque distributor 23 calculates an engine torque based on the estimated amount of intake air. The engine torque calculator 233 estimates the torque of the engine 4, for example, when the spark plug 41 ignites at the MBT. The phase adjuster 234 adjusts the phase of the torque of the engine 4. In the example of control of FIG. 8, since the engine speed of the engine 4 is comparatively low, a delay time is set. The estimated engine torque increases gradually with the progress of time from a time t3 which is after the time t1. Corresponding to the increase in the amount of intake air, the ignition timing changes after the time t3. Note that the ignition timing is assumed to be the MBT also after the time t3.

The torque distributor 23 sets a target motor torque based on the target torque and the estimated engine torque value. The target motor torque is set so that the delay of the torque change of the engine 4 is supplemented. From the time t1 to the time t3, the torque of the engine 4 does not change (i.e., the torque does not rise). Thus, the target torque is realized by the target motor torque rising in a stepwise manner at the time t1. Therefore, the response delay of the torque change of the automobile 1 with respect to the operation of the accelerator pedal 19 is suppressed.

Corresponding to the torque of the engine 4 increasing gradually after the time t3, the target motor torque decreases gradually until time t4. The torque change of the engine 4 synchronizes with the torque change of the motor 5. Therefore, the deviation of the actual torque of the automobile 1 from the target torque is suppressed. The target torque is achieved also after the time t3.

Note that also when the driver releases the stepped-on accelerator pedal 19 and the automobile 1 slows down, unlike in FIG. 8, the motor 5 supplements the delay of the torque reduction of the engine 4 in this driving force control device. Thus, the response delay of the torque change of the automobile 1 with respect to the operation of the accelerator pedal 19 is suppressed, and the deviation of the actual torque of the automobile 1 from the target torque is suppressed.

Note that when reducing the torque of the engine 4, since the motor 5 supplements the delay, the engine 4 can reduce the torque by reducing the amount of intake air, while maintaining the MBT without retarding the ignition timing. Therefore, the fuel efficiency of the automobile 1 improves.

MODIFICATIONS

Figure 9:
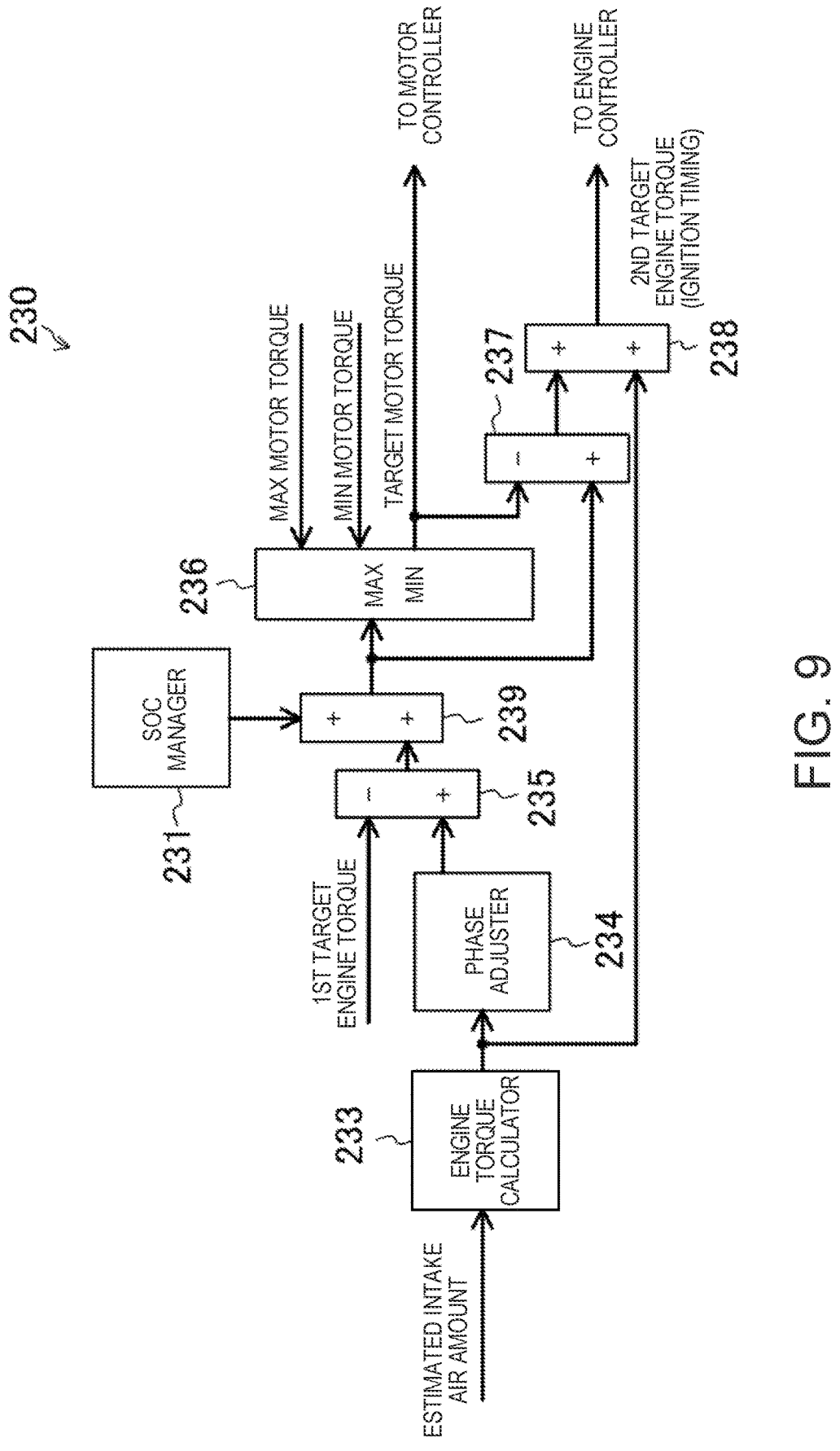
FIG. 9 illustrates a modification of the torque distributor.

FIG. 9 illustrates a modification of the torque distributor 23 as a torque distributor 230. FIG. 9 illustrates some of functional blocks of the torque distributor 230. The torque distributor 230 includes the SOC manager 231, the first adder subtracter 232 (omitted in FIG. 9), the engine torque calculator 233, the phase adjuster 234, the second adder subtracter 235, the limiter 236, the third adder subtracter 237, the adder 238, and a second adder 239.

The engine torque calculator 233 estimates the torque of the engine 4 in the future based on the amount of intake air estimated by the engine controller 24, as described above. The phase adjuster 234 adjusts the phase of the torque of the engine 4 according to the engine speed of the engine 4.

Unlike the second adder subtracter 235 of the torque distributor 23 of FIG. 5, this second adder subtracter 235 calculates a difference between the estimated engine torque and the first target engine torque. The second adder subtracter 235 calculates the delay of the torque response of the engine 4. The difference is equivalent to the torque to be supplemented by the motor 5.

The second adder 239 adds the output of the second adder subtracter 235 to the output of the SOC manager 231. The output of the second adder subtracter 235 is the difference between the estimated engine torque and the first target engine torque. The output of the SOC manager 231 is the target motor torque set based on the target torque of the automobile 1 and the battery information, as described above. In other words, the second adder 239 corrects the target motor torque set by the SOC manager 231 so that the delay of the torque response of the engine 4 is supplemented.

Note that if the difference is zero in the second adder subtracter 235, the target motor torque set by the SOC manager 231 will not be corrected.

The limiter 236 sets the final target motor torque based on the target motor torque corrected by the second adder 239, the maximum motor torque, and the minimum motor torque, similarly to the above. As described above, when the target motor torque is limited by the minimum motor torque, the third adder subtracter 237 and the adder 238 set the second target engine torque so that the torque of the engine 4 is reduced.

Also in this modification, since the target motor torque is set so as to supplement the delay of the torque response of the engine 4, the response delay of the torque change of the automobile 1 with respect to the operation of the accelerator pedal 19 is suppressed. Further, since it is based on the torque estimation of the engine 4 in the future from the present time, the deviation of the actual torque from the target torque can be eliminated or substantially eliminated.

Figure 10:
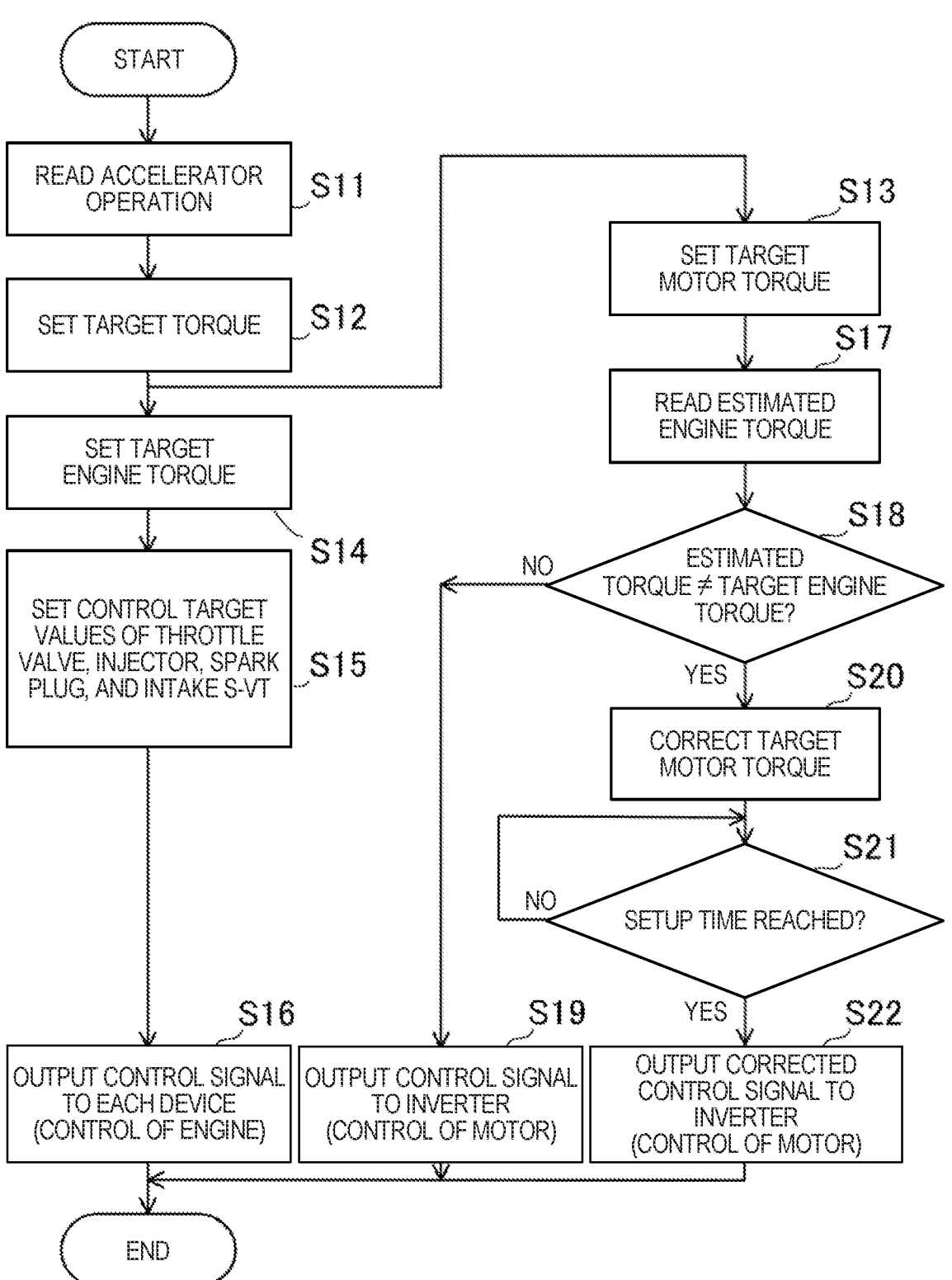
FIG. 10 is a flowchart according to a control of the driving force control device.

FIG. 10 illustrates a fundamental control flow of the driving force control device provided with the torque distributor 230 of FIG. 9. Note that in this control flow, steps related to some of the functional blocks of the torque distributor 230 of FIG. 9 are omitted.

First, at Step S11, the controller 20 reads the driver's accelerator operation based on the measurement signal of the accelerator position sensor 51. At the subsequent Step S12, the torque converter 21 and the torque adjuster 22 set the target torque of the automobile 1.

At Step S13, the SOC manager 231 sets the target motor torque.

On the other hand, at Step S14, the first adder subtracter 232 sets the target engine torque based on the target torque of the automobile 1 and the target motor torque. At Step S15, the engine controller 24 sets control target values of the throttle valve 43, the injector 42, the spark plug 41, and the intake S-VT 44. At subsequent Step S16, the engine controller 24 outputs a control signal to the throttle valve 43, the injector 42, the spark plug 41, and the intake S-VT 44 based on the corresponding control target value set at Step S15. The engine 4 is controlled by the controller 20.

The engine torque calculator 233 and the phase adjuster 234 estimate the engine torque in the future from the present time based on the target engine torque, in parallel to the processes of the control flow. At Step S17, the estimated engine torque is read. At subsequent Step S18, by the second adder subtracter 235 calculating the difference between the estimated engine torque and the first target engine torque, the controller 20 determines whether the estimated engine torque differs from the first target engine torque. If the determination of Step S18 is No, the process shifts to Step S19. If the determination of Step S18 is Yes, the process shifts to Step S20.

At Step S20, the controller 20 corrects the target motor torque after the setup time from the present time. That is, the second adder 239 adds the difference between the estimated engine torque and the first target engine torque to the target motor torque.

At Step S21, the controller 20 determines whether it reaches the setup time related to the torque estimation of the engine 4. If the determination of Step S21 is No, the process repeats Step S21, and if the determination of Step S21 is Yes, the process shifts to Step S22.

At Step S22, the motor controller 25 outputs the control signal according to the corrected target motor torque to the inverter 7. Therefore, the torque change of the motor 5 synchronizes with the torque change of the engine 4. The response delay of the torque change with respect to the operation of the accelerator pedal 19 is suppressed, and the deviation of the actual torque of the automobile 1 from the target torque is suppressed. The target torque of the automobile 1 is achieved.

If the target motor torque is not corrected, the motor controller 25 outputs at Step S19 the control signal according to the target motor torque set at Step S13 to the inverter 7. The motor 5 is controlled through the inverter 7 so that the target motor torque (as a result, the target torque of the automobile 1) is achieved.

SUMMARY

Therefore, the driving force control device for the vehicle includes the motor 5 which generates the torque for the vehicle to travel by being supplied with electric power, the engine 4 which combusts fuel inside the cylinder to generate the torque for the vehicle to travel, and the controller 20 which receives the accelerator operation signal and outputs the control signal corresponding to the accelerator operation to the motor 5 and the engine 4. The controller 20 sets the target torque of the vehicle corresponding to the accelerator operation (the torque converter 21, the torque adjuster 22), and distributes the target engine torque according to a predefined distribution rule (the torque distributors 23, 230), based on the target torque of the vehicle, and outputs the control signal corresponding to the target engine torque to the engine 4 (the engine controller 24). The controller 20 estimates a future amount of intake air to the cylinder from the present time based on the target engine torque (the engine controller 24, FIG. 6), and estimates the torque of the engine 4 after the setup time from the present time based on the estimated amount of intake air (the engine torque calculator 233, phase adjuster 234). The controller 20 sets the target motor torque after the setup time based on the estimated torque of the engine 4 after the setup time so that the target torque of the vehicle is achieved (the second adder subtracter 235, the limiter 236, the second adder 239), and outputs the control signal corresponding to the target motor torque to the motor 5 (the motor controller 25) to synchronize the torque response of the engine with the torque response of the motor 5.

Since a high-response motor 5 supplements the response delay of the engine 4, the response delay of the torque change with respect to the accelerator operation is suppressed in this driving force control device.

Since the target motor torque is set based on the estimated engine torque in the future, the torque response of the engine synchronizes with the torque response of the motor in this driving force control device. In this driving force control device, the deviation of the actual torque from the target torque can be eliminated or substantially eliminated.

In the estimation of the torque of the engine 4, the controller 20 delays the torque change of the engine 4 with respect to the estimated change in the amount of intake air more, as the engine speed of the engine 4 decreases (the phase adjuster 234, FIG. 7).

The controller 20 can estimate the change in the torque of the engine 4 in the future from the present time with sufficient accuracy.

The controller 20 shortens the delay time related to the torque change more, as the engine speed of the engine 4 increases, and, when the engine speed of the engine 4 is higher than the reference engine speed r0, it sets the delay time to zero (the phase adjuster 234, FIG. 7).

The estimation accuracy of the torque of the engine 4 in the future from the present time increases. Further, since the engine speed of the engine 4 is high, even if the delay time is set to zero, the controller 20 can estimate the torque of the engine 4 with sufficient accuracy.

The controller 20 sets the target motor torque to supplement the difference between the estimated torque of the engine 4 and the target engine torque (the second adder subtracter 235, the second adder 239, FIG. 9).

Therefore, the motor 5 can supplement the response delay of the engine 4.

The controller 20 estimates the torque of the engine 4 after the setup time from the present time based on the estimated amount of intake air and the optimal ignition timing which is defined based on the operating state of the engine 4 (the engine torque calculator 233, the phase adjuster 234).

The motor 5 can assist the engine 4 appropriately.

The controller 20 sets the target motor torque higher than the minimum torque which can be generated by the motor 5 (the limiter 236). When the target motor torque is limited by the minimum torque, the controller 20 retards the ignition timing of the engine 4 from the optimal ignition timing so that the torque of the engine 4 is reduced (the third adder subtracter 237, the adder 238).

Therefore, the torque of the vehicle exceeding the target torque is avoided.

The controller 20 estimates the change in the opening of the throttle valve 43 of the engine 4 after the accelerator operation, based on the target engine torque (the throttle opening estimator 241), estimates the amount of air which passes through the throttle valve 43 based on the estimated opening of the throttle valve 43 and the pressure of the intake manifold of the engine 4 (the throttle passing air amount estimator 242), estimates the amount of air inside the intake manifold based on the estimated amount of air which passes through the throttle valve 43 (the intake manifold air amount estimator 244), and estimates the future amount of intake air to the cylinder based on the estimated amount of air inside the intake manifold (the multiplier 248).

The controller 20 can estimate the future amount of intake air to the cylinder from the present time.

The controller 20 estimates the change in the open-and-close timing of the intake valve of the engine 4 after the accelerator operation based on the target engine torque (the S-VT change estimator 246), estimates the charging efficiency based on the estimated open-and-close timing of the intake valve (the charging efficiency estimator 247), and estimates the future amount of intake air to the cylinder based on the estimated charging efficiency and the estimated amount of air inside the intake manifold (the multiplier 248).

The controller 20 can estimate the future amount of intake air to the cylinder from the present time with sufficient accuracy.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

4 Engine
5 Motor
20 Controller
43 Throttle Valve

What is claimed is:

1. A driving force control device for a vehicle, comprising:
 a motor configured to generate torque for the vehicle to travel by being supplied with electric power;
 an engine configured to combust fuel inside a cylinder to generate torque for the vehicle to travel; and
 a controller configured to receive an accelerator operation signal and output a control signal corresponding to the accelerator operation to the motor and the engine, wherein
 the controller sets a target torque of the vehicle corresponding to the accelerator operation, and distributes a target engine torque according to a predefined distribution rule, based on the target torque of the vehicle, and outputs a control signal corresponding to the target engine torque to the engine,
 during acceleration while in motion, the controller estimates a future amount of intake air to the cylinder at a predetermined time from a present time based on the target engine torque, and estimates a torque of the engine at the predetermined time based on the estimated future amount of intake air,
 during acceleration while in motion, the controller sets a target motor torque at the predetermined time based on the estimated torque of the engine at the predetermined time so that the target torque of the vehicle is achieved, and outputs a control signal corresponding to the target motor torque to the motor to synchronize a torque response of the engine with a torque response of the motor, when estimating the torque of the engine, the controller delays a torque change of the engine with respect to a change in the estimated future amount of intake air as an engine speed of the engine increases,
 the controller shortens a delay time of the torque change as the engine speed increases, and sets the delay time to zero when the engine speed is higher than a reference engine speed, and
 the controller sets control target values of a throttle valve, an injector, a spark plug, and an intake S-VT of the engine based on the target engine torque.

2. The driving force control device of claim 1, wherein the controller sets the target motor torque so as to supplement a difference between the estimated torque of the engine and the target engine torque.

3. The driving force control device of claim 1, wherein the controller estimates the torque of the engine at the predetermined time from the present time based on the estimated future amount of intake air and an optimal ignition timing defined based on an operating state of the engine.

4. The driving force control device of claim 3,
 wherein the controller sets the target motor torque higher than a minimum torque that is generatable by the motor, and
 wherein when the target motor torque is limited by the minimum torque, the controller retards the ignition timing of the engine from the optimal ignition timing so that the torque of the engine is reduced.

5. The driving force control device of claim 1, wherein the controller is further configured to:
 estimate a change in an opening of the throttle valve of the engine after an accelerator operation, based on the target engine torque;
 estimate an amount of air passing through the throttle valve based on a change in the estimated opening of the throttle valve and a pressure of an intake manifold of the engine;
 estimate an amount of air inside the intake manifold based on the estimated amount of air passing through the throttle valve; and
 estimate the future amount of intake air to the cylinder based on the estimated amount of air inside the intake manifold.

6. The driving force control device of claim 5, wherein the controller is further configured to:
 estimate a change in an open-and-close timing of an intake valve of the engine after the accelerator operation based on the target engine torque;
 estimate a charging efficiency based on the estimated open-and-close timing of the intake valve; and
 estimate the future amount of intake air to the cylinder based on the estimated charging efficiency and the estimated amount of air inside the intake manifold.

* * * * *